United States Patent [19]
Holmberg

[11] 3,844,001
[45] Oct. 29, 1974

[54] LOCK FOR A THREE-POINT SAFETY BELT FOR MOTOR VEHICLES

[76] Inventor: Gote Eskil Yngve Holmberg, Posfiada 2010, 33020 Anderstorp, Sweden

[22] Filed: Aug. 6, 1973

[21] Appl. No.: 386,147

Related U.S. Application Data

[63] Continuation-in-part of Ser. No. 800,968, Feb. 20, 1969, abandoned, and a continuation of Ser. No. 121,642, March 8, 1971, abandoned.

[52] U.S. Cl. .................................. 24/233, 297/389
[51] Int. Cl. ........................ A44b 13/02, A47c 31/00
[58] Field of Search ..... 24/230 A, 230 AV, 245 SB, 24/233, 123 X; 297/381, 385

[56] References Cited
UNITED STATES PATENTS
2,694,244  11/1954  Nolan ............................ 24/230 AV
2,856,665  10/1958  Gimalouski ..................... 24/230 AT
3,510,151  5/1970  Weman ........................... 297/389 R FOREIGN PATENTS OR APPLICATIONS
709,162  1931  France ........................... 24/230 AT Primary Examiner—Paul R. Gilliam
Assistant Examiner—Andrew M. Calvert

[57] ABSTRACT

A lock for a three-point safety belt providing a continuous hip and shoulder strap comprises a frame having a pivoted bar and a pivoted latch for locking the bar in a closed position. The frame defines together with the bar an elongated slot when the bar is in the closed position for retaining the belt therein in a manner to permit the belt to slip through the slot.

1 Claim, 7 Drawing Figures

PATENTED OCT 29 1974　3,844,001

LOCK FOR A THREE-POINT SAFETY BELT FOR MOTOR VEHICLES

This application relates to three-point safety belts for motor vehicles and locks therefor and is a continuation-in-part of pending U.S. Pat. application Ser. No. 800,968 filed Feb. 20th, 1969, and a continuation of Ser. No. 121,642, filed Mar. 8, 1971, both now abandoned.

More particularly the invention relates to three-point safety belts for motor vehicles, comprising a continuous hip and shoulder strap which forms a loop between two points on a wall of the motor vehicle body structure such loop being retained or anchored to the body floor panel by means of a lock or latch which is fixedly mounted on the body floor panel. Such lock or latch comprises a pivoted bar or shackle the loop being engaged therewith and means for latching the bar or shackle in such position that the loop is prevented from being disengaged therefrom.

An important advantage of safety belts of the type referred to is that it is not necessary to have on the hip and shoulder strap a locking tongue or other metal fitting which may complicate the operation of the safety belt, in particular when the latter is provided with an automatic strap retractor.

A main object of the invention is to simplify the lock and to reduce the price thereof without impairing the operation and the reliability of the lock.

A further object is to provide a lock which does not permit the loop to be clamped in the lock without being securely engaged with the bar thereof.

Accordingly, the invention provides a lock for anchoring a safety belt extending between two points on a wall of a body structure at a loop position of the belt intermediate the two points to form a shoulder strap and a hip strap comprising, in combination, a frame adapted to be attached to the body structure and formed with spaced outwardly extending first and second pairs of side walls defining first and second slots therebetween which are in alignment with each other; a bar pivotally mounted in the first slot for movement into and out from the second slot; a latching member pivotally mounted in the second slot for locking the bar therein in a position to prevent the bar to be released therefrom by an outward pulling movement; the frame and the bar at their portions intermediate the first and second pairs of side walls being shaped to define an elongated slot at least as wide and thick as a safety belt and closed off by the frame when the bar is in a locked position for anchoring a safety belt therein in a manner to permit the belt to slip through the slot and for releasing the belt when the bar is released from a locked position; biasing means attached to the bar and to the latching member to bias the bar to an open position and the latching member to a latching position; and means for affixing the frame to a position on the body structure.

The invention will be described in greater detail by way of examples and with reference to the accompanying drawings, in which FIG. 1 is an elevational side view of the lock in a closed position with the bar shown in dash and dot lines in an open position;

Figure 1:
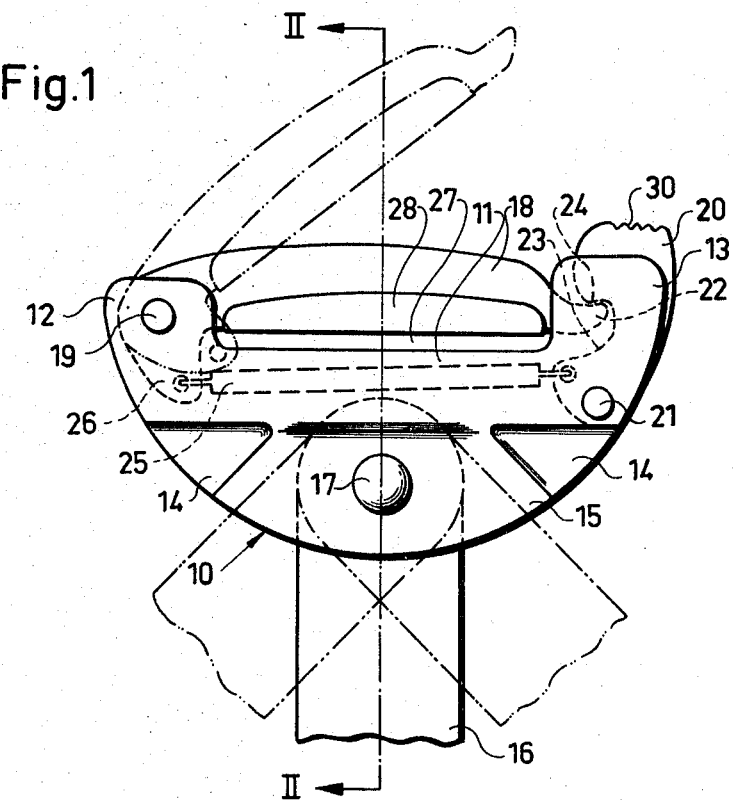
Figure 2:
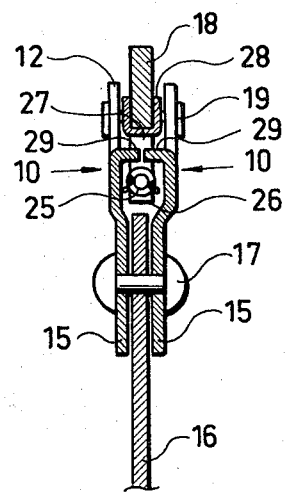
FIG. 2 is a cross-sectional view of the lock on line II—II in FIG. 1.

The lock according to FIGS. 1 and 2 comprises a frame composed of two metal sheet stampings 10, which has a U-shaped portion providing an intermediate portion 11 and end portions 12 and 13 forming two pairs of side walls defining slots therebetween which are in alignment with each other. Metal stampings 10 abut one another at portions 14 and form between said portions a pocket 15 receiving one end of a steel strip 16 for mounting the lock as an anchoring or retaining means on the body floor panel of a motor vehicle said strip being pivotally connected with the frame by means of a rivet 17 passing through the metal stampings and the strip and interconnecting the metal stampings which are abutting each other at portions 14. Thus, the frame is pivotable on strip 16 over an angle defined by portions 14.

Between metal stampings 10 a bar or shackle 18 is pivotally mounted in the slot formed by portion 12 by means of a rivet 19, interconnecting metal stampings 10. A latching member 20 is pivotally mounted in the slot formed by portion 13 by means of a rivet 21 also interconnecting metal stampings 10. Bar 18 forms a nose 22 which may be moved into and out from the slot formed by portion 13 by swinging bar 18 on rivet 19, and latching member 20 provides a recess 23 to present an abutment surface 24 for engagement with nose 22.

A tension coil spring 25 forming biasing means has one end hooked into an arm 26 integral with and projecting from bar 18, and has the other end hooked into latching member 20 in order to bias the bar to an open position which is shown in dash and dot lines in FIG. 1, and the latching member 20 to a latching position shown in FIG. 1. This position of the latching member is determined by the abutment thereof against the adjacent portion 14 of the frame.

When latching member 20 is in its latching position shown in FIG. 1, bar 18 is kept in a closed position shown in FIG. 1 essentially in parallel to intermediate portion 11 by the engagement between nose 22 and abutment surface 24. In this position bar 18 and portion 11 between portions 12 and 13 define an elongated slot 27. The longitudinal boundary surfaces of said slot are formed by a marginal shield provided by a channel member 28 on bar 18 and opposite marginal portions 29, bent towards each other, of the intermediate portion 11 formed by metal stampings 10. The slot should be at least as wide and thick as a safety belt to be used together with the lock, and closed off by the frame when bar 18 is in a locked position engaged by latch 20. Thus, the belt may slide unobstructedly through the slot. However, the width of the slot should be less than twice the thickness of the belt to be received therein such that it is not possible to cause latching member 20 to engage nose 22 by manually depressing the bar if the loop should be laid, by mistake, in a double fold between bar 18 and marginal portions 29. Latching member 20 and nose 22 provide edge surfaces interengaging when bar 18 is depressed to a closed position, to push back the latching member by a cam action.

According to FIGS. 1 and 2 there is provided a single spring 25 having the double purpose of actuating bar 18 as well as latching member 20. The spring is received in the frame provided by metal stampings 10 in a cavity formed by intermediate portion 11 which provides an elongated box section. The upward movement of bar 18 by the action of the spring may be limited to a suitable angular position by abutment of arm 26 against marginal portions 29.

Figure 3:
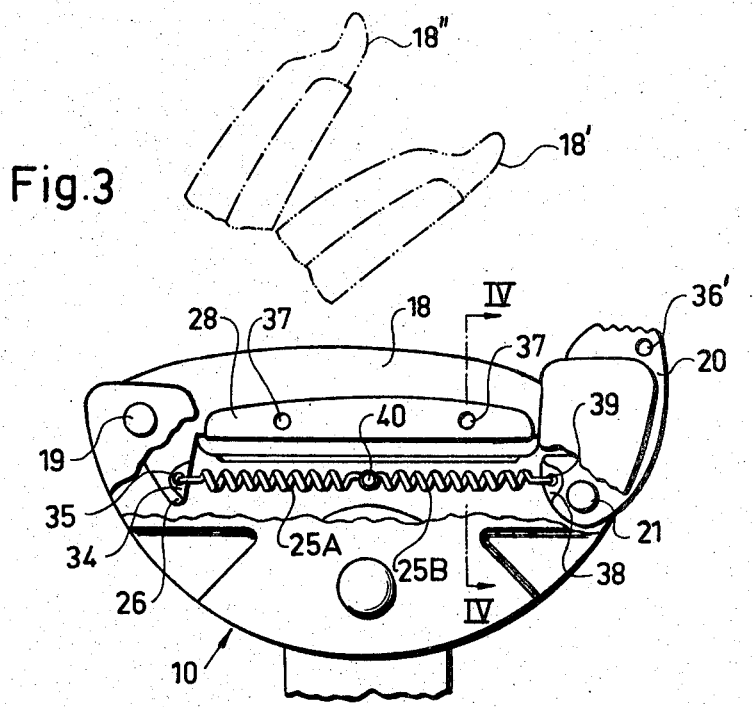
FIG. 3 is a fragmentary elevational side view of a modified embodiment of the lock partly in section.
Figure 4:
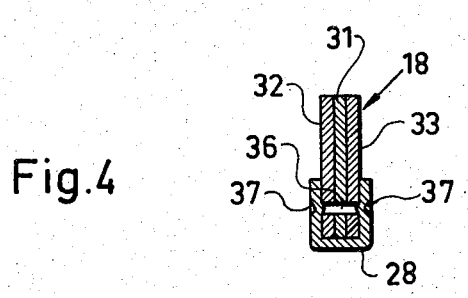
FIG. 4 is an enlarged cross-sectional view of the bar on line IV—IV in FIG. 3.

According to FIGS. 3 and 4 bar 18 as well as latching member 20 is of a laminated construction, which is shown in greater detail with respect to bar 18 in FIG. 4. This bar consists of a central metal sheet stamping 31 and two outer metal sheet stampings 32 and 33 disposed on each side thereof. The sheet stampings have exactly the same configuration except that each of the two outer sheet stampings 32 and 33 are provided with a marginal cut out 34 in order to expose central sheet stamping 31 on both sides of bar 18 around an aperture 35 in arm 26 of the bar for securing the spring therein. Two pins 36 extend through registering apertures in the sheet stampings, and lining 28 has punched depressions 37 opposite said pins whereby the sheet members are held in a fixed position with respect to each other to form a rigid unit. Preferably, the outer sheet stampings are coated with a lacquer in a suitable colour, whereas the central sheet stamping is uncoated in order to form an ornamental pattern along the edge surface of the bar.

Latching member 20 is constructed in an analogous manner as a laminated structure of three metal sheet stampings, the two outermost of which are provided with a marginal recess 38 in order to expose the central sheet stamping around an aperture 39 for securing the spring therein. The stampings are interconnected by means of a rivet 36'.

The biasing means for bar 18 and latching member 20 in this case is not a single coil spring, as in FIGS. 1 and 2, but two individual coil springs 25A and 25B spring 25A consisting of a combined tension and pressure spring and spring 25B of a tension spring. One end of spring 25A is hooked into aperture 35 in arm 26 the other end being hooked onto a rivet 40 provided in frame 10. Spring 25A is tensioned when bar 18 is in the locked position shown in full lines in FIG. 3.

One end of spring 25B is hooked into aperture 39 in latching member 20, the other end thereof being hooked onto rivet 40, and this spring, too, is tensioned and retains latching member 20 in the latching position shown. When latching member 20 is operated manually in order to release bar 18 against the bias provided by spring 25B, bar 18 will swing under the spring bias to the position 18' shown in dash and dot lines in FIG. 3. This angular position of bar 18 is suitable for engaging the belt loop around the bar but it is less suitable for pulling off the belt loop from the bar when the safety belt is to be loosened. For the latter operation a further raised position is more suitable such as is shown in double dot and dash lines and is designated 18''. To this position the bar may be swung by being externally actuated, for instance by pulling the belt loop under simultaneous compression of spring 25A. When the external actuation ceases the bar will fall down to the position 18'. The fact that spring 25A is a combined pressure and tension spring means that the windings of the spring are mutually spaced when the spring has moved bar 18 to the position 18' such spaces disappearing or being at least partly reduced by compression of the spring when the bar is swung to position 18''.

The number of metal sheet stampings of the laminated bar and latching member structure may be more than three. Furthermore, springs 25A and 25B may be provided by a single spring element, as in FIGS. 1 and 2, which is secured between its ends in the frame by means of a rivet 40 and is tensioned to various degrees with respect to that portion which is secured in the bar and that portion which is secured in the latching member, in order to obtain the correct spring load on the bar and the latching member, respectively, when these elements are engaged with each other.

Figure 5:
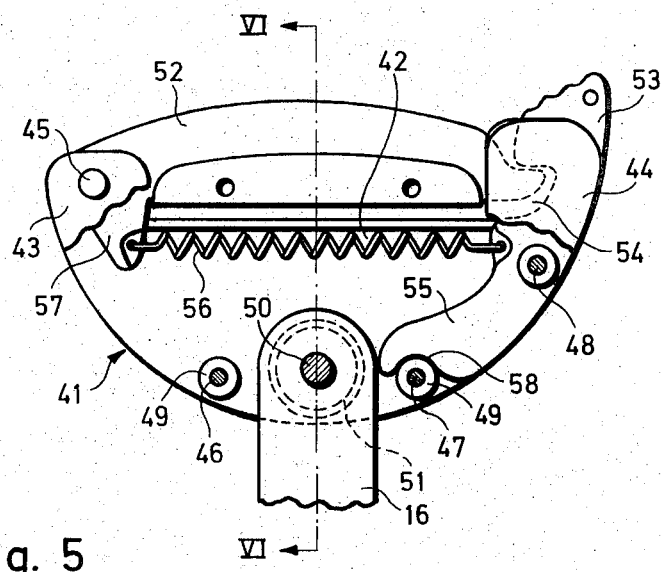
FIG. 5 is a fragmentary elevational side view, partly in section, of a further modified embodiment of the lock according to the invention.
Figure 6:
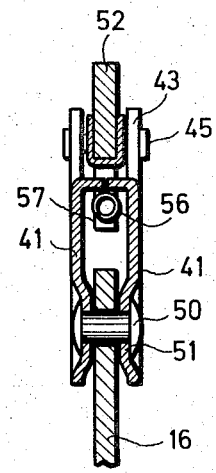
FIG. 6 is a cross-sectional view of the lock according to FIG. 5 on line VI—VI in FIG. 5.

In the embodiment of the invention disclosed in FIGS. 5 and 6 the lock comprises a frame composed of two metal sheet stampings 41, which has an intermediate portion 42 and end portions 43 and 44. Metal stampings 41 are interconnected by rivets 45, 46, 47 and 48 spacer sockets 49 being provided on said rivets as shown at rivets 46, 47 and 48 to mutually space metal sheet stampings 41. Thus, there is formed between said stampings a space into which is introduced steel strip 16 for mounting the lock on the body floor panel as previously described said strip being pivotally connected to the lock frame by means of a rivet 50 passing through the metal stampings and the strip. The metal stampings are formed with protuberances 51 on the sides thereof facing each other, around rivet 50 as shown in FIGS. 5 and 6. The frame is pivotable on steel strip 16 over an angle defined by spacer sockets 49 on adjacent rivets 46 and 47.

Between metal stampings 41 a bar 52 is pivotally mounted in the slot formed by end portion 43 by means of rivet 45 and this bar is of the same form as that previously described and may be of laminated structure. A latching member 53 is pivotally mounted in the slot formed by portion 44 by means of rivet 48 and provides a recess 54 to receive therein the nose of latching member 52 in the manner described above. In the embodiment according to FIGS. 6 and 7 latching member 53 is provided with an extension 55 which is integral therewith and forms together with the latching member 53 a double-armed lever. A tension coil spring 56 has one end hooked into an arm 57 projecting from bar 52 and the other end hooked into latching member 53 in the manner described above to bias the bar to an open position and to bias the latching member to the latching position shown in FIG. 5 and determined by abutment of extension 55 against the spacer socket on rivet 47 said extension forming a recess 58 to receive said spacer socket therein.

The lock described with reference to FIGS. 5 and 6 operates in the same way as those described with reference to FIGS. 1 to 4. However, extension 55 provides a further advantage which will be explained with reference to FIG. 7.

Figure 7:
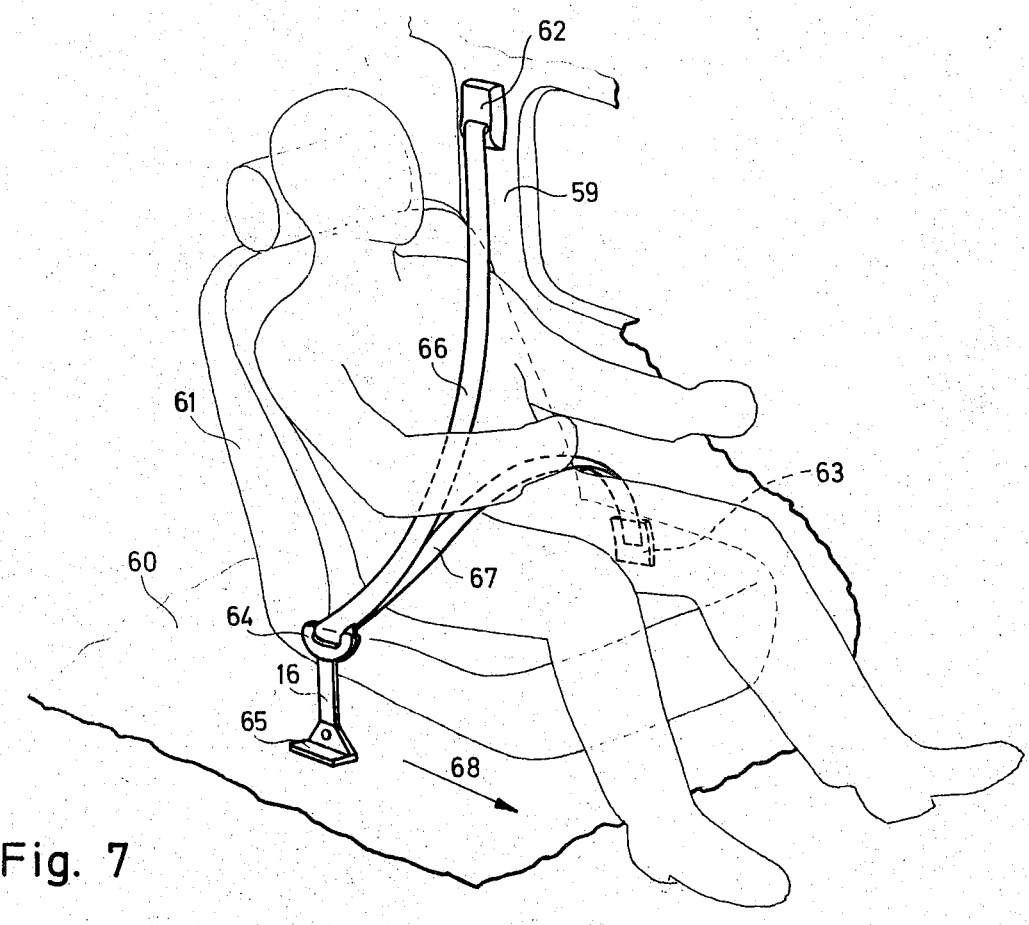
FIG. 7 is a perspective view showing a three-point safety belt anchored in an operative position by means of a lock according to the invention.

In FIG. 7 there is fragmentarily shown a motor vehicle body forming a side wall 59 and a floor panel 60. The floor panel supports a seat 61 for which there is provided a safety belt comprising a flexible web, which is secured to side wall 59 at an upper level by a fitting 62 and at a lower level by a fitting 63 and forms a loop detachably anchored or retained by means of the lock according to the invention generally indicated at 64, the lock being connected with floor panel 61 by means of steel strip 16 which is mounted on the floor panel by means of a bracket 65. It will be seen that the safety belt when engaged with lock 64 extends from fitting 62 to the lock to form a shoulder belt portion 66 and from the lock to fitting 63 to form a hip belt portion 67. The belt forms a continuous loop passing through the slot formed between the bar and the frame of the lock and is permitted to slip through said slot as previously described. As is common practice in the safety belt art there may be provided one or two belt retractors having inertia reels to retract the safety belt to or through both or each of fittings 62 and 63 in order to keep the safety belt stretched over the seated person and to retract the safety belt to a non-operative position close to body wall 59 when disengaged from lock 64.

The lock according to the invention is to be mounted in the vehicle with the frame of the lock extending substantially in a longitudinal plane of the vehicle as shown in FIG. 7. In order that the loop formed by the safety belt between the mounting points defined by fittings 62 and 63 may be easily applied on bar 18 and 53, respectively, when disengaged from the latching member and swung to an upward position by the spring bias it is preferred that the end of the lock frame mounting the latching member is directed towards the front end of the vehicle in the direction indicated by an arrow 68 in FIG. 7. However, if the locks according to FIGS. 1 to 4 are mounted in this manner there may be a risk that the latching member will move forwardly during the influence of inertia forces thereby disengaging the bar if the vehicle is suddenly retarded such as in a collision. This means that the safety belt may be inadvertently disengaged from the lock such that it will not operate in the manner intended to prevent the seated person from being thrown forwardly from the seat. However, if the latching member is formed as a double-armed lever as in the embodiment according to FIGS. 5 and 6, the inertia forces acting on the latching member are counteracted by the inertia forces acting on extension 56 in order to prevent the latching member from disengaging the bar.

What I claim is:

1. A lock for anchoring a safety belt extending between two points on a wall of a body structure at a loop position of the belt intermediate the two points to form a shoulder strap and a hip strap, comprising, in combination, a frame adapted to be attached to the body structure and formed with spaced outwardly extending first and second pairs of side walls in a U-shape defining first and second slots therebetween which are in alignment with each other, and an intermediate elongated cavity; a bar pivotally mounted in the first slot for movement into and out from the second slot; a double-armed lever pivotally mounted between the arms thereof in the second slot, which lever extends along said slot and includes a first arm forming a latching member for locking the bar in said second slot in a position to prevent the bar from being released therefrom by an outward pulling movement, and a second arm extending substantially in a direction opposite to that of the first arm to form a counterweight therefor; the bar when it is in the locked position closing off an elongated slot at least as wide and thick as a safety belt for anchoring a safety belt therein in a manner to permit the belt to slip through the slot and when it is released from a locked position releasing the belt; a single tension coil spring biasing means extending within the elongated cavity of the frame between the two pairs of outwardly extending side walls and attached at one end to the bar and at the other end to the latching member to bias the bar to an open position and the latching member to a latching position; and means for affixing the frame to a position on the body structure.

* * * * *